March 31, 1970  F. A. KASHKIN, JR., ET AL  3,504,369
RECORDER WITH MULTIPLE THREADED LEAD SCREW
Filed Oct. 29, 1968
FIG. 1
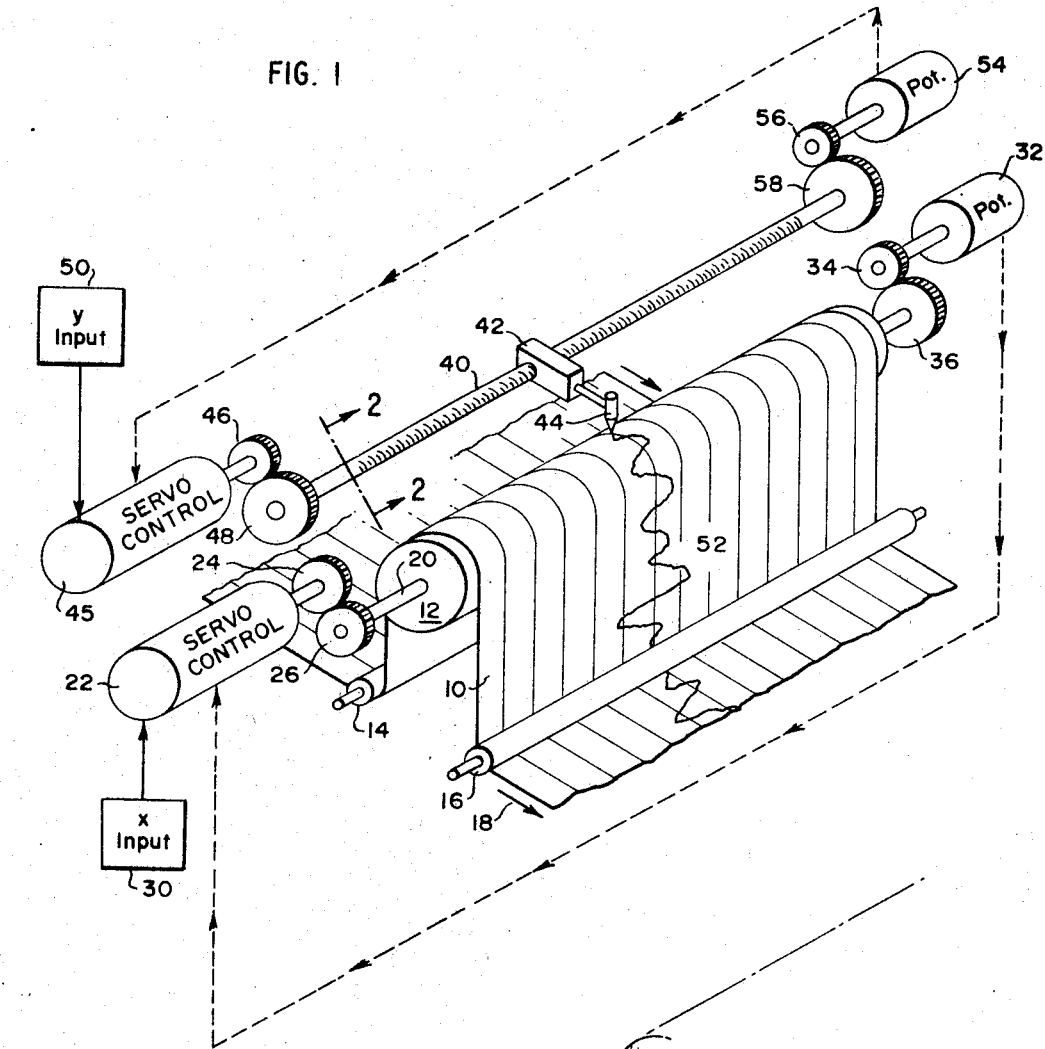
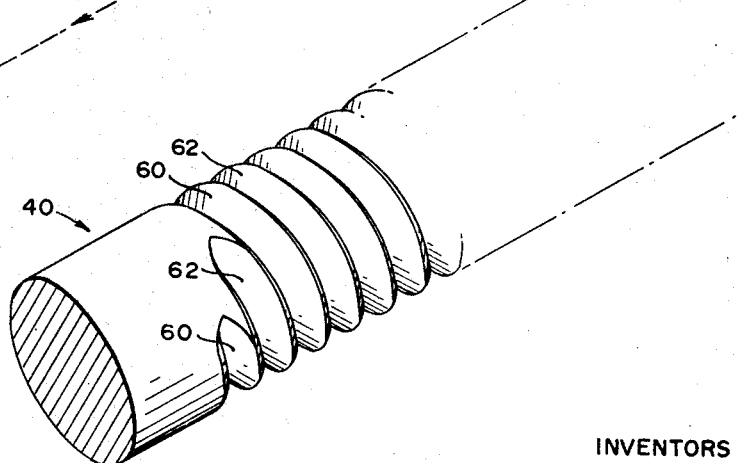
FIG. 2
INVENTORS
FRANCIS A. KASHKIN, JR.
HENRY J. DUMAS, JR.
BY
*Blair Cesari & St. Onge*
ATTORNEYS

United States Patent Office 3,504,369
Patented Mar. 31, 1970

3,504,369
RECORDER WITH MULTIPLE THREADED LEAD SCREW
Francis A. Kashkin, Jr., Boston, and Henry J. Dumas, Jr., Framingham, Mass., assignors to Mechanics for Electronics, Cambridge, Mass.
Filed Oct. 29, 1968, Ser. No. 771,413
Int. Cl. G01d 9/00
U.S. Cl. 346—32                                                  5 Claims

ABSTRACT OF THE DISCLOSURE

A recording device employs a multiple-thread lead screw to move a correspondingly threaded carriage containing the tracer. The multiple-thread lead screw construction minimizes backlash and yields a higher ratio of linear travel of the tracer in proportion to screw rotation, thereby maximizing recorder sensitivity.

BACKGROUND OF THE INVENTION

The present invention relates to recorders. It relates more particularly to an improved drive system for chart-type recorders.

The recorders with which we are concerned here are automatic, graphic, data-recording systems which yield a visual presentation of conditions which vary with time. The recorder may record water depth, temperature, pressure, or any of a wide variety of other parameters. One of the most common types of recorder is the ink writer which is used to transcribe data on a strip chart. In this devise, a moving strip of paper contains printed coordinates so that fluctuations in a monitored parameter may be recorded continuously by means of a pen that moves transverse to the strip in response to changes in the parameter. In a simple potentiometric strip chart recorder, the strip of paper moves at a fixed rate so that movement of the pen produces a trace which shows the variation of that parameter with time.

In other applications, the strip itself moves in accordance with a second parameter so that the system becomes an X–Y plotter.

The most common type of recorder employs a tracing element or pen which is moved by a system of strings and pulleys driven by a servomotor which responds to signals representing the parameter being measured. That type of recorder is not entirely satisfactory because the calibration deteriorates due to stretch and creep of the strings. Further, these instruments have to be restrung periodically due to wear.

Another type of recorder employs a lead screw to advance the tracing element. While this second type avoids the pitfalls attending the first type, it is still not entirely satisfactory. A certain amount of backlash invariably exists between the lead screw and the threaded rider carrying the pen. This decreases the accuracy of the visible trace generated by the instrument. Also, the sensitivity of these prior recorders employing lead screws is not good enough to allow such devices to be used in applications demanding very precise reading. There have been attempts to make them more sensitive by using higher gear ratios to increase the amount of gear rotation for a given input. However, this necessitates using larger gears in the drive system which give rise to additional backlash and play. Moreover, the larger gears increase the overall size and weight of the recorder. The multiple-thread lead screw construction minimizes backlash and yields a higher ratio of linear travel of the tracer in proportion to screw rotation, thereby maximizing recorder sensitivity.

Accordingly, it is an object of the present invention to provide a strip chart recorder which is relatively simple and inexpensive to make.

Another object of the invention is to provide a recorder characterized by the accuracy of its readings.

Still another object of the invention is to provide a recorder having good sensitivity.

A further object is to provide a recorder which is relatively small and lightweight.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Briefly, my chart-type recorder comprises a roll for advancing a strip of chart paper. A conventional drive system is used to rotate the roll uniformly with respect to time or in accordance with a selected parameter. A multiple-thread lead screw is rotatively mounted adjacent the paper on the roll. The lead screw is arranged parallel to the roll and spaced slightly from the paper. A correspondingly threaded rider or block is threadedly received on the lead screw. The rider carries a conventional pen or other tracing instrument which makes a visible trace on the paper as that is moved over the roll.

The lead screw is rotated by means of a servomotor which responds to electrical signals indicative of the parameter being monitored. Rotation of the lead screw causes the rider and pen to move transversely to the direction of movement of the paper so that the magnitude of the parameter is indicated by the deviation of the trace from a fixed line or axis extending the length of the paper.

The lead screw is a multistart helical screw containing two or more parallel helical threads. The threaded passage in the rider has the same construction. This multiple-threaded arrangement yields a relatively high ratio of linear travel of the rider on the lead screw to angular rotation of the screw. Accordingly, the recorder is sensitive even to small changes in the input to the recorder. That is, even small variations in the monitor parameter will cause relatively large excursions of the trace from the chart axis. Yet this is accomplished using relatively small gears and relatively small gear ratios, i.e. 10:1 or less, in the drive system. Consequently, backlash in the drive system is kept to a minimum.

BRIEF DESCRIPTION OF THE DRAWING

For a fuller understanding of the nature and objects of the invention, reference should be had to the following detailed description taken in connection with the accompanying drawing, in which:

FIG. 1 is a diagrammatic perspective view of a strip chart recorder embodying the principles of my invention; and FIG. 2 is an enlarged perspective view of a portion of FIG. 1.

DESCRIPTION OF THE PREFERRED EMBODIMENT

A strip of chart paper 10 served from a roll supply (not shown) engages over a chart-driving roll 12 and passes under guide rods 14 and 16 arranged parallel to roll 12 on each side thereof. Chart paper 10 moves in the direction indicated by arrow 18 and is subsequently rewound on a conventional takeup roll (not shown).

Roll 12 is rotatively supported by its axle 20. The roll is rotated by means of a conventional servocontrol 22 which includes a servomotor driving a spur gear 24 in mesh with a second similar gear 26 on axle 20.

In the case of a conventional potentiometric strip chart recorder, roll 20 is rotated at a uniform rate. However, in the illustrated application, it is driven at a nonuniform rate in response to an X axis input signal from a source 30 applied to servocontrol 22 so that the system functions as an X-Y plotter 22.

As is the usual case, axle 20 drives a feedback potentiometer 32 by way of gears 34 and 36. Potentiometer 32 develops a position signal which is fed back to develop an error signal for servocontrol 22.

Still referring to FIG. 1, a lead screw 40 is rotatively mounted above and parallel to roll 12. Screw 40 carries a correspondingly threaded rider 42 containing a pen or stylus 44 which is arranged to write on paper 10.

Lead screw 40 is rotated by means of a servomotor in a servocontrol 45 by way of spur gears 46 and 48, the latter being connected to rotate with screw 40. Servocontrol 45 rotates screw 40 in response to signals from a Y input source 50. Rotation of screw 40 causes rider 42 and pen 44 to move transversely to the direction of travel of paper 10 (i.e., perpendicular to arrow 18), thereby generating a visible line trace 52 on the paper.

A feedback potentiometer 54 similar to potentiometer 32 is connected to screw 40 by way of spur gears 56 and 58. Potentiometer 54 develops a feedback signal which represents the lead screw position. Thus, with the recorder receiving both inputs, pen 44 generates a trace 52 on paper 10 which is a graphical presentation of Y as a function of X.

Referring now to FIG. 2, in accordance with the present invention, lead screw 40 is a multistart screw having a plurality, herein two, parallel threads 60 and 62. Typically, for a fourteen start screw, the screw pitch is 9/16 inch per revolution.

Thus, for each turn of the screw, rider 42 will move a relatively large distance transverse to the direction of travel of paper 10. This makes the recorder quite sensitive even to small changes in the Y input signal. That is, a small change in the parameter Y produces a pronounced and easily visible excursion of the trace 52 on paper 10. It also enables the recorder to use relatively few small gears thereby minimizing lost motion and play in the drive system and so maximizing the accuracy of the recorder.

The multiple thread engagement between screw 40 and rider 42 also minimizes the backlash which normally occurs when rider 42 reverses its direction of travel on screw 40. Accordingly, the recorder as a whole generates a trace 52 which reflects accurately the variations in the parameters being measure.

It will be seen from the foregoing then that the utilization of the multiple-thread lead screw to move the tracing element in recorders of this type simplifies recorder construction and minimizes its cost. Still, however, my recorder yields a more accurate reading because it reduces the backlash found in prior instruments of this type.

It will thus be seen that the objects set forth above, among those made apparent from the preceding description, are efficiently attained and, since certain changes may be made in the above construction without departing from the scope of the invention, it is intended that all matter contained in the above description, or shown in the accompanying drawing, shall be interpreted as illustrative and not in a limiting sense.

We claim:
1. A recorder comprising
    (A) a rotatable roll,
    (B) means for advancing paper over said roll,
    (C) means for providing a visible trace on the paper as it moves over said roll, said means including
        (1) a lead screw spaced adjacent said roll, said lead screw having a plurality of parallel threads having the same pitch extending along its length,
        (2) a correspondingly threaded tracing element threadedly engaging said screw and arranged to provide a trace on the paper engaging over said roll, and
        (3) means for rotating said screw in response to a parameter-indicating input signal thereby producing on the paper carried by said roll a trace which indicates variations in said parameter.

2. A recorder as defined in claim 1 wherein said paper advancing means comprises means for rotating said roll in response to a second signal indicating another parameter so that said recorder functions essentially as an X-Y plotter.

3. A recorder as defined in claim 2 wherein said roll rotating means comprises
    (A) a servocontrol system including a servomotor,
    (B) means for connecting the armature of said motor to said roll so that said servomotor rotates said roll in response to said second signal,
    (C) a feedback potentiometer for providing an output signal to said servocontrol system, and
    (D) means for connecting said roll to said potentiometer so that said potentiometer provides a signal to said servocontrol sytem indicating the instantaneous position of said roll.

4. A recorder as defined in claim 1 wherein said lead screw rotating means comprises
    (A) a servocontrol system including a servomotor,
    (B) means for connecting the armature of said servomotor to said lead screw so that said servomotor rotates said lead screw in response to said input signal,
    (C) a feedback potentiometer for providing an output signal to said servocontrol system, and
    (D) means for connecting said lead screw to said potentiometer so that said potentiometer provides a signal to said servocontrol system indicating the instantaneous position of said tracing means.

5. A recorder as defined in claim 1 wherein said tracing means comprises
    (A) a block,
    (B) a tracer fixed to said block and engaging the paper on said roll, and
    (C) means defining a transverse passage through said block, said passage being multiply-threaded in correspondence with said screw so that with each rotation of said screw, said block advances an appreciable distance along said screw so that the output trace of the recorder is relatively sensitive to changes in the parameter controlling the rotation of said screw.

References Cited

UNITED STATES PATENTS

| | | | |
|---|---|---|---|
| 776,315 | 11/1904 | Friez | 346—65 X |
| 3,046,554 | 7/1962 | Brumley | 346—31 X |
| 3,380,065 | 4/1968 | Alpert et al. | 346—136 X |

JOSEPH W. HARTARY, Primary Examiner

U.S. Cl, X,R,

73—409; 346—139